United States Patent
Speicher et al.

(10) Patent No.: US 6,434,464 B1
(45) Date of Patent: Aug. 13, 2002

(54) PROCESS FOR EVALUATING THE DRIVING DYNAMIC REQUEST OF THE DRIVER FOR THE DRIVING STRATEGY OF AN AUTOMATIC/AUTOMATED TRANSMISSION

(75) Inventors: Patrick Speicher, Oberteuringen; Ralf Vorndran, Eriskirch, both of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/981,071

(22) Filed: Oct. 16, 2001

(30) Foreign Application Priority Data

Oct. 20, 2000 (DE) .......................................... 100 51 963

(51) Int. Cl.⁷ .......................... G06F 15/50; F16H 59/18
(52) U.S. Cl. .......................... 701/51; 701/53; 477/120; 477/121; 477/904; 477/905
(58) Field of Search .................. 701/51, 53; 477/34, 477/120, 121, 904, 905

(56) References Cited

U.S. PATENT DOCUMENTS

| | | | |
|---|---|---|---|
| 4,058,796 A | * 11/1977 | Oishi et al. | 340/459 |
| 4,987,888 A | * 1/1991 | Funabashi et al. | 123/406.46 |
| 5,415,142 A | * 5/1995 | Tsubakiji et al. | 123/336 |
| 5,499,953 A | 3/1996 | Hayasaki | 477/120 |
| 5,625,558 A | * 4/1997 | Togai et al. | 123/349 |
| 6,033,041 A | * 3/2000 | Koga et al. | 188/159 |
| 6,278,986 B1 | * 8/2001 | Kamihira et al. | 701/101 |

FOREIGN PATENT DOCUMENTS

| | | | |
|---|---|---|---|
| DE | 41 36 613 C2 | 3/1994 | F16H/59/18 |
| DE | 43 37 957 A1 | 5/1994 | F16H/59/24 |
| DE | 44 19 753 A1 | 4/1995 | F16H/59/18 |

* cited by examiner

Primary Examiner—William A. Cuchlinski, Jr.
Assistant Examiner—Olga Hernandez
(74) Attorney, Agent, or Firm—Davis & Bujold, P.L.L.C.

(57) ABSTRACT

The invention concerns a process for evaluating a driving dynamic request of a driver for the driving strategy of one of an automatic or automated transmission of a motor vehicle. It is proposed to calculate an accelerator pedal stroke, from the accelerator pedal actuation, which is supplied to the driving strategy as an input parameter to the driving strategy equivalent to the driving dynamic request. To this end, a rough value of the accelerator pedal stroke is calculated, especially by subtraction of the accelerator pedal position at beginning of the accelerator pedal movement from the accelerator pedal position, from accelerator pedal values which are in fixed event-dependent ratio to each other. The accelerator pedal stroke results from an event-dependent filtering of the rough value of the accelerator pedal stroke during which a filtering function starts at the end of the accelerator pedal movement, especially when the accelerator pedal position is constant over a presettable time. The rough value of the accelerator pedal, existing at this moment, breaks down by a presettable time function.

14 Claims, 4 Drawing Sheets

PROCESS FOR EVALUATING THE DRIVING DYNAMIC REQUEST OF THE DRIVER FOR THE DRIVING STRATEGY OF AN AUTOMATIC/AUTOMATED TRANSMISSION

FIELD OF THE INVENTION

The invention concerns a process for evaluating the dynamic request of a driver for the driving strategy of an automatic or automated transmission of a motor vehicle.

BACKGROUND OF THE INVENTION

A driving strategy for automatic or automated transmissions of motor vehicles, in particular continuously variable and stepped automatic mechanical transmissions and automated transmissions, have among others the function of setting the correct ratio or the correct rotational speed of the engine for the driver. The driving strategy reacts here especially to the driver who steers, brakes and gives gas. The driver here dynamic articulates his wish for driving essentially via the accelerator pedal ("gas pedal"), that is, via the absolute accelerator pedal position and by the manner in which he opens the throttle or closes the throttle.

The accelerator pedal gradient or a similar signal directly coupled therewith has been customarily used in the prior art to judge how the driver moves the accelerator pedal. The accelerator pedal gradient is here the first inference in time of the usually filtered accelerator pedal position or the filtered first inference in time of the unfiltered signal of the accelerator pedal position. The use of said parameter of accelerator pedal gradient for the driving strategy has some fundamental disadvantages.

On one hand, it is very difficult and in all probability also not implementable to differentiate at substitute programming and application expense between a very slow continuous change of the accelerator pedal position by the driver, that is, a very small driving activity, and the usually existing permanent small interferences (so-called "jitters") on the measured signal of the accelerator pedal position. The driving strategy thus can react very poorly, or not at all, to very slow accelerator pedal movements of the driver.

Besides, the accelerator pedal gradient itself does not take into account the absolute change of the accelerator pedal position, or only indirectly does, but only the speed at which said change occurs. But the driver expects upon certain accelerator pedal movement with a slight change of the accelerator pedal value a reaction of the vehicle different from that upon an equally quick accelerator pedal movement with a greater change of the accelerator pedal value. In addition, the level of accelerator pedal value, starting from which he introduces said change, is relevant to the driver's expectation. Since these different activities of the driver cannot be differentiated by the accelerator pedal gradient and yet have to be taken into account in the driving strategy, at least one other or a different input signal is required for the driving strategy.

The accelerator pedal gradient also reproduces the driver's request for dynamics only very incompletely. Determined by principle, the gradient immediately breaks down again after the end of the accelerator pedal movement. However, the driver's request for a dynamic reaction of the vehicle stays longer or only breaks down slowly instead of promptly. If nevertheless now the driver's request for dynamics is adequately reflected by means of the accelerator pedal gradient, an expensive processing of said operand related to the past is further needed.

Due to the accelerator pedal geometry and the accelerator pedal spring tension (supplying and restoring forces), the accelerator pedal gradient that the driver can adjust and obtain depends on the direction of movement of the accelerator pedal (open throttle, close throttle) and on the position of the accelerator pedal at the start of the accelerator pedal movement. For example, during a subjectively "equally quick" accelerator pedal change, the driver adjusts from an absolute accelerator pedal position of 0% an accelerator pedal gradient different from an accelerator pedal position of 50% also determined by the kinematics of the accelerator pedal and the foot actuation.

If the driver changes the direction of movement of the accelerator pedal, a divergence between the calculated and the actual accelerator pedal gradient, a so-called caster of the accelerator pedal gradient results, especially due to filtering time. This is disturbing for the driver especially at the reversal point of a quick change in the direction of movement of the accelerator pedal (quick positive or quick negative load change), since here within the caster time the actual and the calculated accelerator pedal gradients have different signs and the driving strategy logically "wrongly" reacts to this input signal in a manner unexpected by the driver.

Therefore, the problem on which this invention is based is to provide an input signal for the driving strategy of an automatic or automated transmission which correctly reflects, at low programming and application cost, the driver's request for driving dynamics which he indicates by the movement of the accelerator pedal.

SUMMARY OF THE INVENTION

This problem is solved, by the process according to the invention, described in further detail below.

It is therefore proposed, according to the invention, that an accelerator pedal stroke is calculated from the movement of the accelerator pedal, instead of the accelerator pedal gradient, as an input parameter for the driving strategy of the transmission equivalent to the driving dynamic request. A rough value of the accelerator pedal stroke is defined here as an actual accelerator pedal position minus the accelerator pedal position at the beginning of the accelerator pedal movement. It is essential here that the rough value of the accelerator pedal stroke is determined from accelerator pedal values which are in a fixed event-dependent ratio to each other.

Compared to the prior art where to form the accelerator pedal gradient accelerator pedal values were always used which are in a fixed time ratio to each other, that is for example, the actual accelerator pedal value and the accelerator pedal value of the last calculated cycle, the change from a time-dependent ratio to an inventive event-dependent ration causes that the driver's driving dynamic request to now be reflected as a parameter of the accelerator pedal movement instead of as a speed of change of the accelerator pedal position ("much or little open throttle" instead of "quick or slow accelerator pedal movement").

According to the invention, the rough value of the accelerator pedal stroke is now event-dependently filtered to form the input parameter of the driving strategy so that a function for filtering the rough value of the accelerator pedal accelerator pedal position is at least approximately constant over a certain time, and the rough value of the accelerator pedal stroke existing at this moment breaks down over a presettable time function. By this breakdown, via the time function, is a "forgetting effect" which optimally simulates the driver's subjective request for abating driving dynamics is advantageously reflected here. During, proper accelerator pedal movement the rough value of the accelerator pedal stroke is broken down to the accelerator pedal stroke.

According to the invention, an input signal is prepared for the driving strategy from the accelerator pedal stroke which signal rightly reflects the driver's driving dynamic request which he indicates by movement of the accelerator pedal, specifically both for very quick and for very slow accelerator pedal movements, for ascending and for descending accelerator pedal movements regardless of the position of the accelerator pedal at the start of the accelerator pedal movement and of small interferences (so-called "jitters") on the measured accelerator pedal position. The programming and application expenses are small here.

In a development of the invention, it is proposed to weigh periodically the rough value of the accelerator pedal stroke during the accelerator pedal movement until a moment at which the filtering function is started depending on events. It is proposed for the periodic weighing, according to the invention, to use the interval from beginning of the accelerator pedal movement until the actual moment of weighing or to design the periodic weighing as a time-discrete stepped function. In particular, it is advantageously possible hereby to take into account in addition a quick or slow opening or closing of throttle, for ex., to purposefully overcompensate the actual accelerator pedal movement without requiring a separate evaluation of the gradient of said accelerator pedal movement.

In other developments of the invention, it can be provided that prior to the start of the event-dependent filtering function, the rough value of the accelerator pedal stroke is weighed with a value of the accelerator pedal at the beginning of the accelerator pedal movement or with the value of the actual accelerator pedal position at the moment of the weighing. Thus, the driving strategy has available a relative accelerator pedal stroke as an input variable, instead of an absolute accelerator pedal stroke, which according to the subjective driver's view corresponds to the desired driving dynamics especially in the case of accelerator pedal movements from a medium to a high accelerator pedal position.

During filtering, during periodic weighing and during value-related weighing, ascending and descending movements of the accelerator pedal, respectively, obviously can be treated differently with the start value of the accelerator pedal movement.

Obviously, it is also possible obviously to provide another control device instead of the accelerator pedal, or also in addition to the accelerator pedal, with an equivalent function with which the driver can act upon the power control of the driving device of the motor vehicle via an arbitrarily formed operative connection such as a manual lever or an electrically controllable driving speed regulator ("Tempomat") and to calculate the inventive accelerator pedal stroke from values of this control device.

BRIEF DESCRIPTION OF THE DRAWINGS

The invention will now be described, by way of example, with reference to the accompanying drawings in which show.

DETAILED DESCRIPTION OF THE INVENTION

Figure 1:
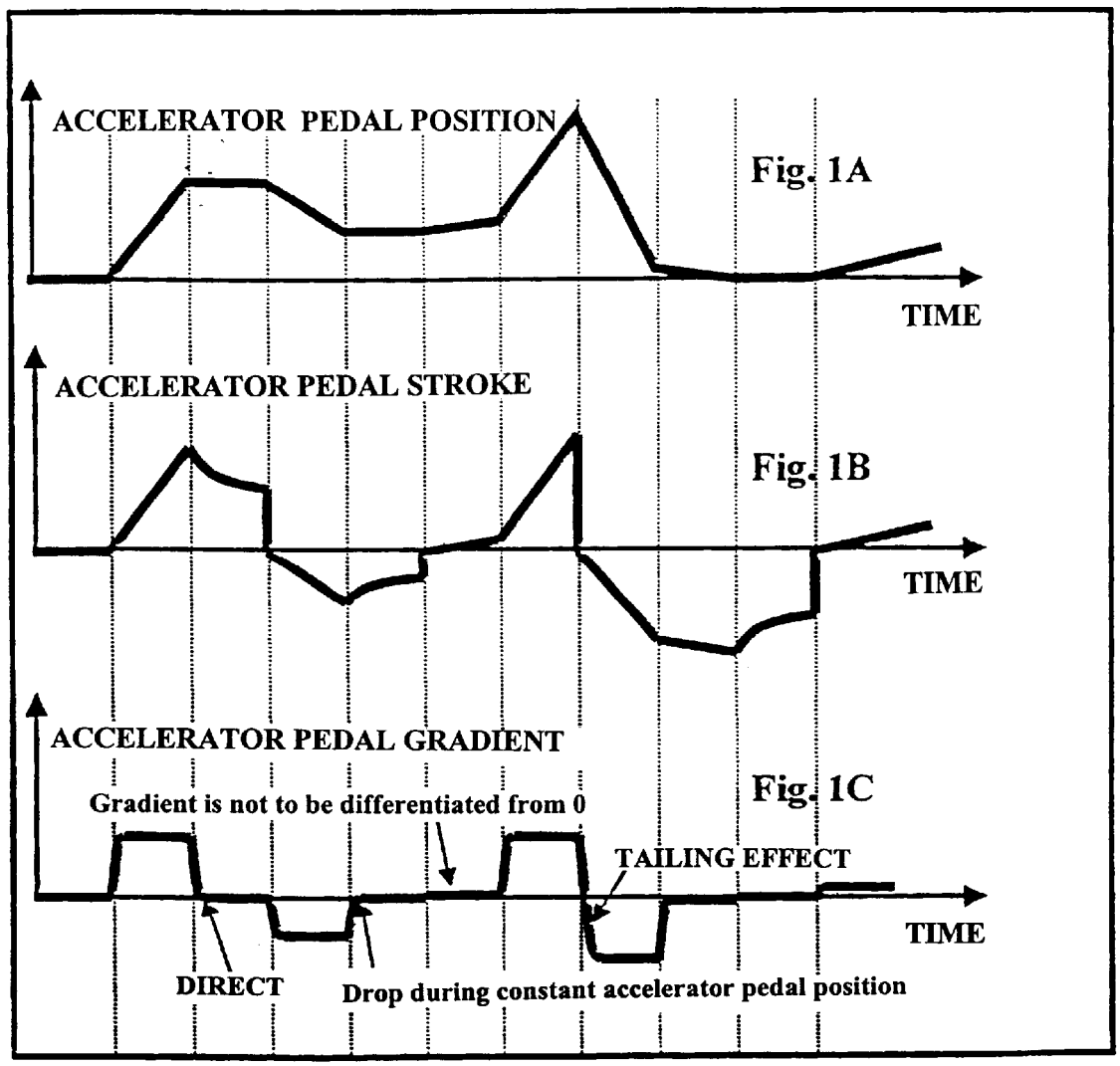
FIG. 1 the fundamental difference between the input signal of the driving strategy "accelerator pedal gradient" according to the prior art (FIG. 1C) and "accelerator pedal stroke" according to the invention (FIG. 1B), in the example of a typical accelerator pedal movement (FIG. 1A)

A typical, diagrammatic time curve of an accelerator pedal position is shown in FIG. 1A. According to the above described prior art, an accelerator pedal gradient is calculated from said accelerator pedal position, as shown in FIG. 1C. From the calculation algorithm of a gradient, it is clear that the accelerator pedal gradient can only reflect the speed of the accelerator pedal movement. It is to be especially emphasized here that the accelerator pedal gradient immediately descends abruptly as soon as the accelerator pedal position assumes a constant value starting from a movement. It can further be seen that in the case of a very slow acceleration movement, the calculated accelerator pedal gradient is hard to be distinguished from a zero value. If an accelerator pedal immediate releases follows opening of the throttle, a periodic caster of the accelerator pedal gradient sets in so that the calculated accelerator pedal gradient is still positive even though the actual accelerator pedal movement is already negative.

On the other hand, FIG. 1B shows a signal curve of the inventive accelerator pedal stroke which results from the preset time curve of the accelerator pedal position (FIG. 1A). According to the invention, during the accelerator pedal movement the actual change of the accelerator pedal position is reflected and not the speed of the accelerator pedal movement.

As the accelerator pedal position ascends, the accelerator pedal stroke descends at least almost proportional to the accelerator pedal position. Hereby the driver's request for open throttle is advantageously reflected exactly.

If the driver now terminates the throttle opening and maintains a thoroughly constant accelerator pedal position, he does not expect any suddenly diminishing of the driving dynamics. To take into account the subjective perception of the driver, according to the invention, the accelerator pedal stroke, which is calculated when reaching a constant accelerator pedal position, is subjected to a periodic breakdown. By this started event-dependent filtering, the steadily diminishing subjective request of the driver for driving dynamics is advantageously almost exactly reflected, for ex., in a degressive time function over a long period of time.

If the driver now closes the throttle, he expects an immediate setting in retardation of the vehicle proportional to an accelerator pedal release. This new driving dynamic request must be immediately available to the driving strategy as a correct input signal. Therefore, according to the invention, the accelerator pedal stroke is set to zero with the occurrence of the accelerator pedal release. The accelerator pedal stroke then goes down at least almost proportionally to a descending accelerator pedal position, therefore becoming negative. In the same manner, a driver's request for a change of the driving dynamics is treated in which case a throttle closing immediately follows a throttle opening. Therefore, an input signal equivalent to a driving dynamic request is also conveniently available to the driving strategy in these driving situations.

The transition from a descending accelerator pedal value to an almost constant value is treated similarly to the transition from an ascending to an almost constant accelerator pedal value, that is, with an event-controlled start of a filtering function. Both equal and different filtering functions can obviously be used here. The filtering functions can, at the same time, be designed as linear and non-linear—for ex., as exponential—functions.

As a further advantage of the invention, an arbitrarily slow change of the accelerator pedal position is recognized which is explained in detail later with reference to FIG. 4.

Figure 2:
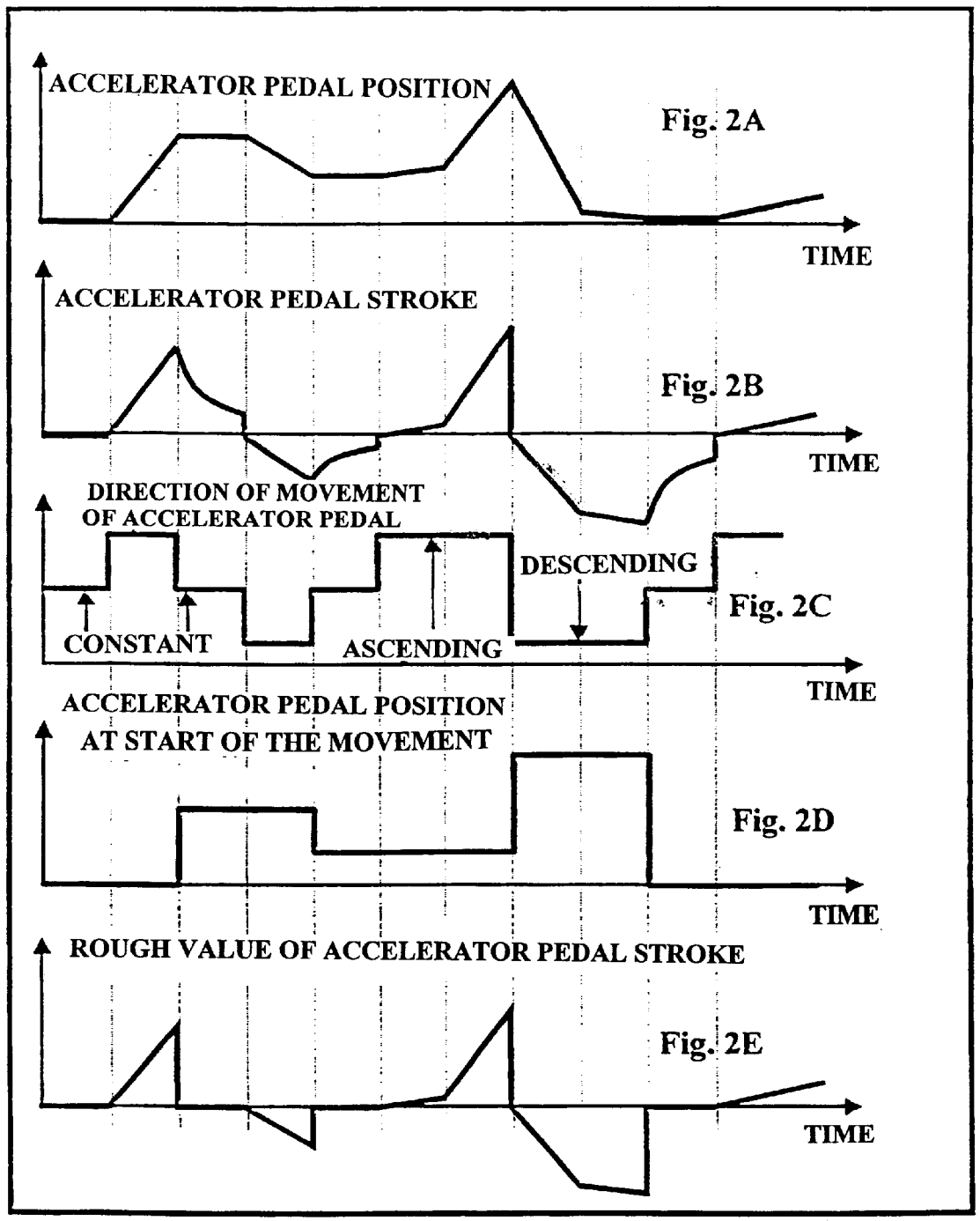
FIG. 2 time-variant properties of the "accelerator pedal stroke" (FIGS. 2B, 2C, 2D, 2E) in the example of a typical accelerator pedal movement (FIG. 2A)

In FIG. 2, time-variant properties of the accelerator pedal stroke are now shown. FIG. 2A again shows a typical, schematized time curve of an accelerator pedal position and FIG. 2B the inventive accelerator pedal stroke calculated therefrom. In order to be able to calculate an accelerator pedal stroke from an accelerator pedal movement, the accelerator pedal direction of movement, at every moment, must be determined. The accelerator pedal direction of movement, corresponding to the accelerator pedal movement according to FIG. 2A, is shown in FIG. 2C. In analogy to the driver's mentality, there are three directions of movement: "ascending", "descending" and "constant". The actual direction of movement results from a comparison between the actual value of the accelerator pedal position and the value thereof from the preceding calculation cycle. If the actual value is higher than the former, the direction of movement is ascending; if the actual value is lower, then the direction of movement is descending. If the value of the accelerator pedal position has not changed, then, after a presettable time period such as 1 second, a decision is made about the further procedure. If the accelerator pedal value changes within said preset time period, the direction of movement is set with a real sign to "ascending" or "descending" according to the change. If the accelerator pedal also does not change within the preset time period, the direction of movement is set to "constant". The length of the presettable time period, therefore, determines a quasi-constant accelerator pedal movement is interpreted as constant.

According to the invention, from the accelerator pedal position (FIG. 2A) and the direction of movement of the accelerator pedal (FIG. 2C), an "accelerator pedal position at the beginning of the movement" of the accelerator pedal is now formed, as shown in FIG. 2D. The series of curves undergo change only when a current movement of the accelerator pedal changes to another direction of movement, such as from "ascending" to "constant" or to "descending". According to the invention, the "accelerator pedal position at the beginning of the movement" is now subtracted from the accelerator pedal position. The parameter thus formed is designated as a rough value of the accelerator pedal stroke and is shown in FIG. 2E. While the accelerator pedal moves, the rough value of the accelerator pedal stroke is a direct measure for the driver's request for driving dynamics.

It is essential to the invention that an event-dependently controlled filtering function be superposed on the previously formed rough value of the accelerator pedal stroke whenever the accelerator pedal position assumes from one movement an at least approximately constant value to form an input signal for the driving strategy representative of the driver's request for driving dynamics. As already described above, said filtering function produces a forgetting effect of the driving dynamics first reflected for the driving strategy from the accelerator pedal movement as needed. During the accelerator pedal movement itself, the rough value of the accelerator pedal stroke is used directly as an input parameter of the driving strategy. As shown in FIG. 2B, the thus formed signal equivalent to driving dynamics is the accelerator pedal stroke.

In one development of the invention, it can also be provided that the rough value of the accelerator pedal stroke, during the accelerator pedal movement, is continuously periodically weighed. With the end of the accelerator pedal movement, that is, with the event-controlled start of the previously described filtering function also terminates the periodic weighing. The inventive periodic weighing of the rough value of the accelerator pedal stroke, therefore, always takes place only when the direction of movement of the accelerator pedal is ascending or descending. The time period from the beginning of the accelerator pedal movement until the actual moment of weighing is conveniently used for the periodic weighing. Another embodiment for the periodic weighing is a time-discretely stepped weighing function in which the rough value of the accelerator pedal stroke, for ex., during the accelerator pedal movement, is multiplied by presettable factors in a presettable time-slot pattern.

In particular, by virtue of the described periodic weighing, it is possible purposefully to overcompensate especially quickly or especially slowly accelerator pedal movements of the driver. Compared to a "normal" accelerator pedal movement, a very quick or very slow accelerator pedal movement indicates a positively strongly increased or reduced driving dynamic request. Therefore, the weighing conveniently leads, in the case of a very quick accelerator pedal movement, to an increase of the accelerator pedal stroke and, in the case of a very slow accelerator pedal movement correspondingly, to a reduction. An input signal is also thus conveniently available to the driving strategy without a separate gradient evaluation so that the driving dynamic request is reflected at least almost exactly even in such extreme driving situations.

Figure 3:
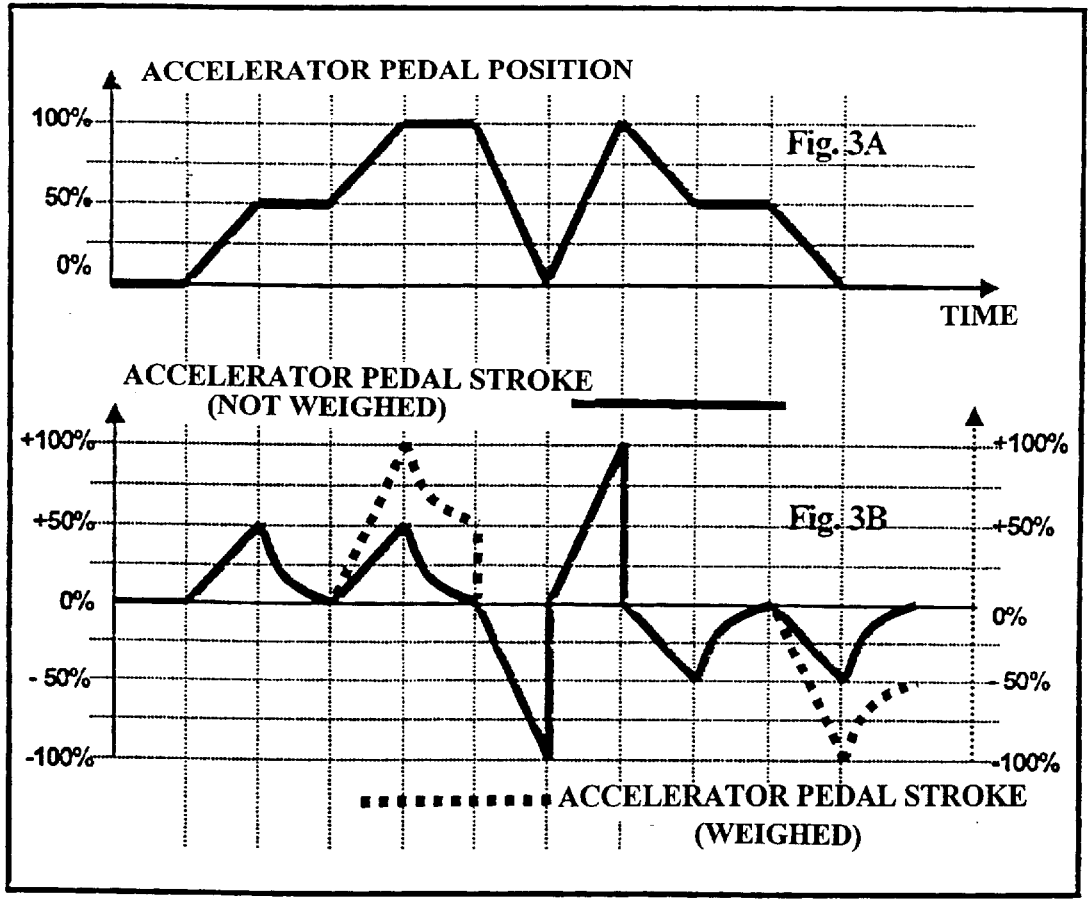
FIG. 3 an example of an inventive weighing of the rough value of the accelerator pedal stroke with the value of the accelerator pedal at the beginning of the accelerator pedal movement (FIG. 3B) in the example of a typical accelerator pedal movement (FIG. 3A)

FIG. 3 shows another development of the invention in which the rough value of the accelerator pedal stroke, during the accelerator pedal movement, is continuously weighed with the value of the accelerator pedal position at the beginning of the accelerator pedal movement, with the end of the accelerator pedal movement, that is, with the event-controlled start of the previously described filtering function also terminates the value-related weighing.

FIG. 3A again shows a typical, schematized time curve of an accelerator pedal position. In FIG. 3B, the inventive accelerator pedal stroke calculated therefrom which results a without periodic and without a value-related weighing of the rough value of the accelerator pedal stroke is shown with a solid line. It is now proposed, according to the invention, to weigh the accelerator pedal stroke, especially in driving situations where the driver from an accelerator pedal position unequal to zero opens the throttle or from an accelerator pedal position unequal to full load closes the throttle, with the value of the accelerator pedal position existing at the beginning of the accelerator pedal movement. In FIG. 3B, the now weighed accelerator pedal stroke curve is shown by way of example with a dotted line. The weighing according to value can be designed here both as a linear and as a non-linear—for ex., exponential—function.

Said value-related weighing function is based on the subjective driver's perception that according to a difference equal accelerator pedal movements from different accelerator pedal positions signalize different driving dynamic requests. The maximum driving dynamic request typically exists during full load independently of the accelerator pedal position from which the full load position was started. Also the minimum driving dynamic request typically exists in the case of idling also independently of the accelerator pedal position from which the idling position was started. If now the driver, for ex., from a medium accelerator position of 50% gives full load, as shown in FIG. 3, only the actually remaining residual accelerator pedal stroke of 50% would be available as an input signal for the driving strategy, without a value-related weighing, even if the driver actually requested the maximum driving dynamics. In the case of equal accelerator pedal movements according to a difference from accelerator pedal positions which lie between the full load and idling angular points, the driver typically expects a differentiated vehicle behavior that takes into consideration both the absolute starting points of his accelerator pedal movement and the pedal path up to its destination.

By the inventive weighing of the accelerator pedal stroke with the value of the accelerator pedal position at the beginning of the accelerator pedal movement, the driver's actual request during an open throttle or a closed throttle is easily well reflected from different accelerator pedal positions.

A value-related weighing of the rough value of the accelerator pedal stroke also is obviously possible with the actual value of the accelerator pedal position.

The parameters of both time-related and value-related weighing and the functional design of the weighing can be different during ascending and descending accelerator pedal directions of movement.

Figure 4:
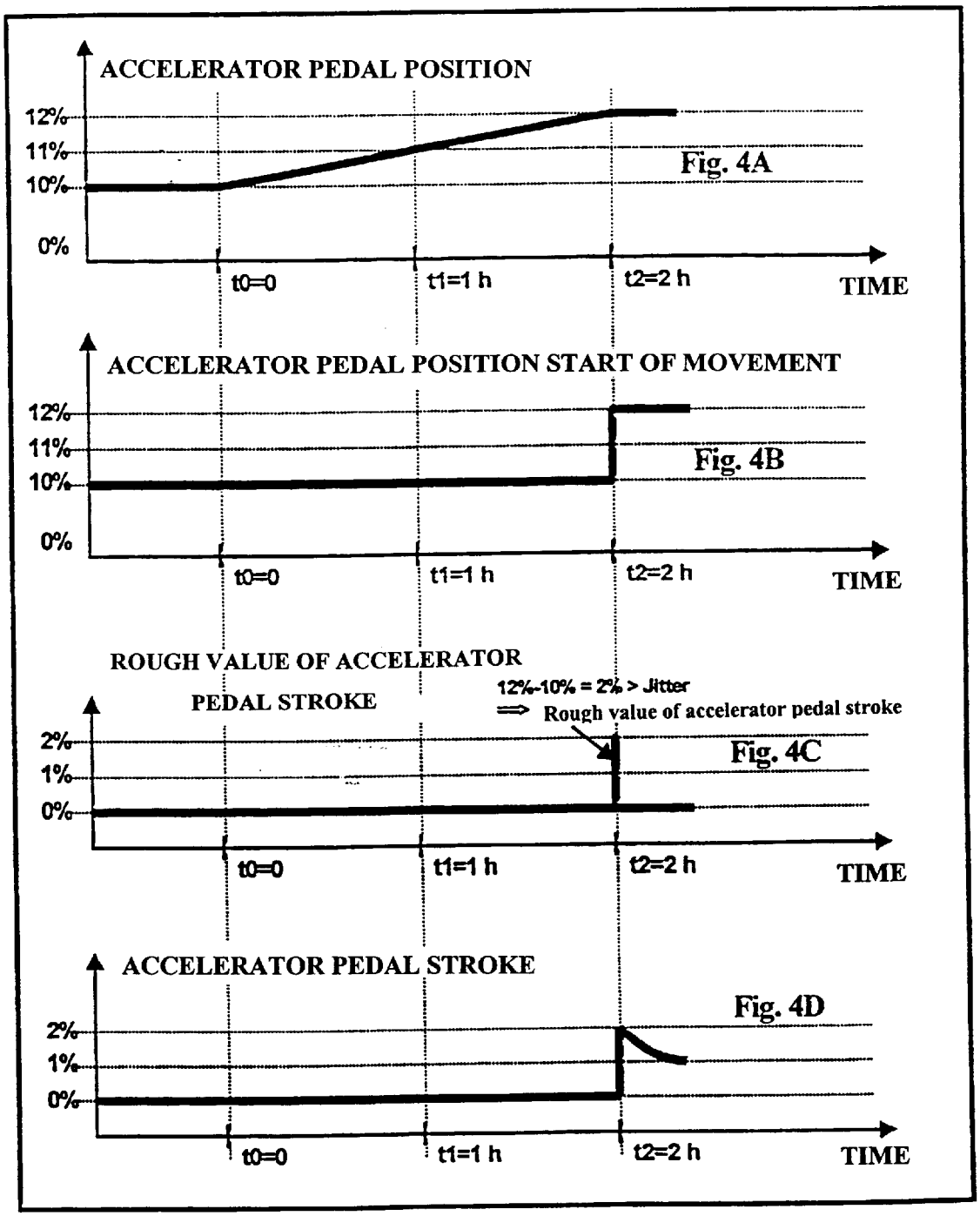
FIG. 4 an example for the inventive detection of any slow accelerator pedal movement.

With reference to FIG. 4, it is now explained in detail how, with the inventive process, any slow accelerator pedal movements can be determined as an accelerator pedal stroke as long as they are outside the usually existing small inexactitudes in measurement of the actual accelerator pedal position. Those so-called jitters are caused by voltage fluctuations of the power supply of the vehicle, for ex., and are generally known.

In FIG. 4A, a time signal curve of an accelerator pedal movement, is shown by way of example, where the accelerator pedal position, starting from moment t0, within 2 hours changes by 2% and thus extremely slowly. FIG. 4B shows the accelerator pedal position corresponding to FIG. 4A at the beginning of the accelerator pedal movement, as already described above with reference to FIG. 2D.

According to the invention, the rough value of the accelerator pedal stroke is defined as an actual accelerator pedal position minus the accelerator pedal position at the beginning of the accelerator pedal movement. According to the time curve of the accelerator pedal position of FIG. 4A, at the moment t1, that is 1 hour after the beginning of the extremely slow accelerator pedal movement, already a very low rough value of the accelerator pedal stroke of 1% would result. If, starting from a constant accelerator pedal position, the accelerator pedal position now changes by a very low value which can be preset as a non-time variant parameter, said change is evaluated according to the invention not as an actual accelerator pedal movement but as an interference signal (similar to a jitter) and suppressed during formation of the rough value of the accelerator pedal stroke. In the example shown, a change of the accelerator pedal position of 1% is suppressed as an interference signal. The rough value of the accelerator pedal stroke thus formed is reproduced in FIG. 4C. Together with the event-controlled start of the filtering after the end of the accelerator pedal movement, the signal curve of the accelerator pedal stroke therefrom results.

What is claimed is:

1. A process for evaluating a driving dynamic request for a driving strategy of one of an automatic and an automated transmission of a motor vehicle via actuation of an accelerator pedal operated by a driver of the vehicle, wherein the accelerator pedal is in operative communication with a driving device of the motor vehicle for supplying driving power to the vehicle, the process comprising the following steps:

calculating a rough value of an accelerator pedal stroke from values of the accelerator pedal which are in fixed event-dependent ratio to each other by subtracting an accelerator pedal position, at the beginning of an accelerator pedal movement, from an actual accelerator pedal position;

filtering the rough value of the accelerator pedal stroke, according to dependent events, to form an accelerator pedal stroke and commencing a filtering function at the end of the accelerator pedal movement, especially when the accelerator pedal position is at least approximately constant over a presettable time;

breaking down the rough value of the accelerator pedal stroke, existing at this moment, via a presettable time function; and supplying the accelerator pedal stroke to the driving strategy as an input parameter equivalent to the driving dynamic request.

2. The process according to claim 1, further comprising the step of constantly periodically weighing the rough value of the accelerator pedal stroke, during the accelerator pedal movement, up to commencement of the filtering step.

3. The process according to claim 2, further comprising the step of weighing, from time to time, the rough value of the accelerator pedal stroke over an interval commence at beginning of the accelerator pedal movement and terminating when at an actual moment when the weighing step occurs.

4. The process according to claim 2, further comprising the step of designing the periodic weighing step as a time-discrete stepped function.

5. The process according to claim 1, further comprising the step of continuously weighing the rough value of the accelerator pedal stroke up to the event-dependent start of the filtering step with the value of the accelerator pedal position at the beginning of the accelerator pedal movement.

6. The process according to claim 1, further comprising the step of continuously weighing the rough value of the accelerator pedal stroke up to the event-dependent start of the filtering step with the actual value of the accelerator pedal position.

7. The process according to claims 2, further comprising the step of, during one of an ascending and a descending direction of movement of the accelerator pedal, varying parameters of the time-related or value-related weighing or the functional design of the weighing.

8. The process according to claim 1, further comprising the step of utilizing a linear function as the filtering step.

9. The process according to claim 1, further comprising the step of utilizing a non-linear function as the filtering step.

10. The process according to claim 1, further comprising the step of utilizing an exponential function as the filtering step.

11. The process according to claim 1, further comprising the step of, during one of an ascending and a descending direction of movement of the accelerator pedal, varying parameters of the filtering step.

12. The process according to claim 1, further comprising the step of utilizing a control device of equivalent function, in addition to the accelerator pedal, by which the driver can act via an arbitrarily input operative communication to the driving device of the vehicle and using corresponding values for the control device for calculation of the accelerator pedal stroke.

13. The process according to claim 12, further comprising the step of using one of a hand-actuated lever and an electrically controllable driving speed regulator as the control device of equivalent function.

14. A process for evaluating a driving dynamic request for a driving strategy of one of an automatic and an automated transmission of a motor vehicle via actuation of a control device of equivalent function operated by a driver of the vehicle, wherein the control device of equivalent function is in operative communication with a driving device of the motor vehicle for supplying driving power to the vehicle, the process comprising the following steps:

calculating a rough value of a control device of equivalent function stroke from values of the control device of equivalent function which are in fixed event-dependent ratio to each other by subtracting a control device of equivalent function position, at the beginning of a control device of equivalent function movement, from an actual control device of equivalent function position;

filtering the rough value of the control device of equivalent function stroke, according to dependent events, to form the control device of equivalent function stroke and commencing a filtering function at the end of the control device of equivalent function movement, especially when the control device of equivalent function position is at least approximately constant over a presettable time;

breaking down the rough value of the control device of equivalent function stroke, existing at this moment, via a presettable time function; and supplying the control device of equivalent function stroke to the driving strategy as an input parameter equivalent to the driving dynamic request.

* * * * *